Figure 1:
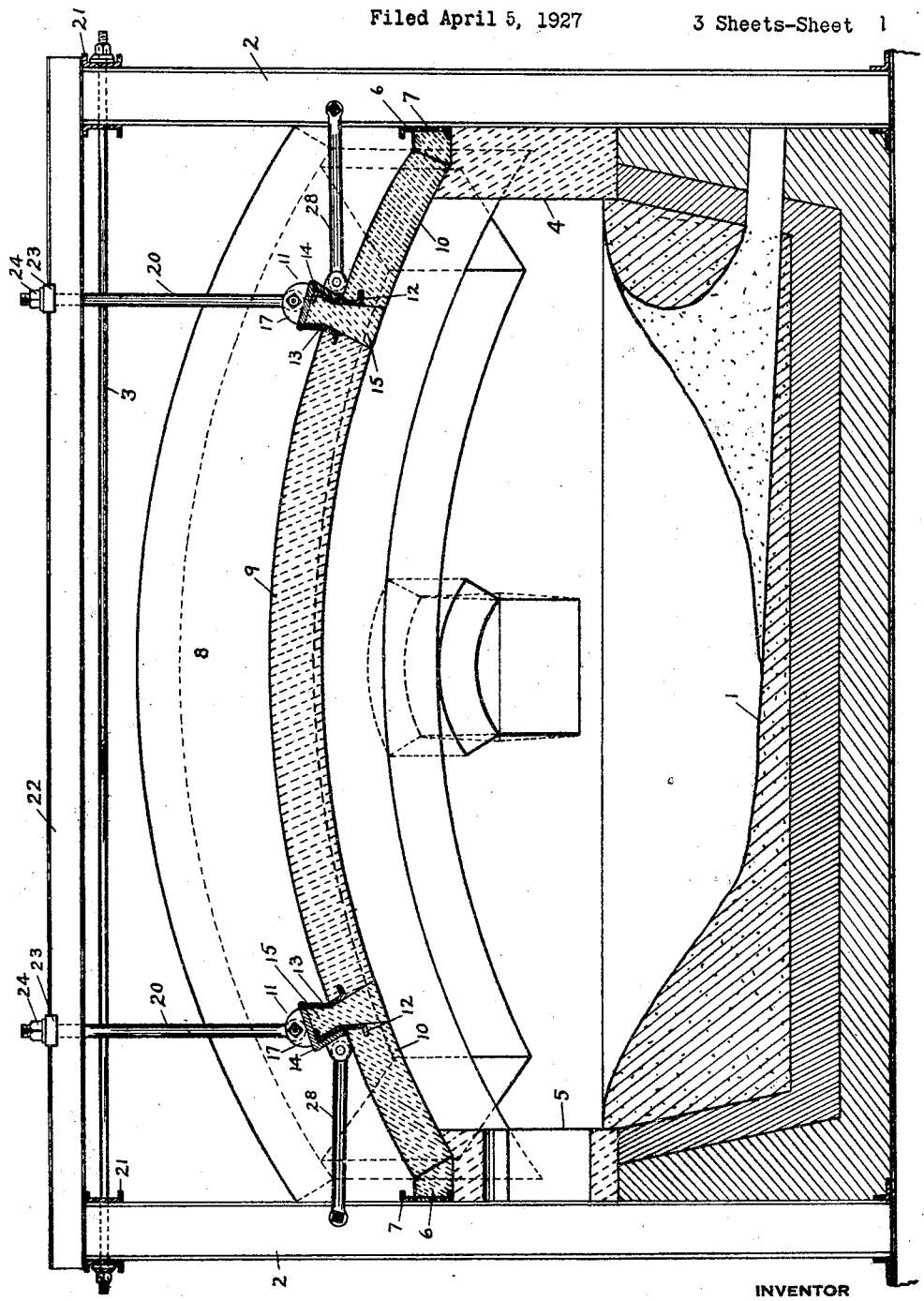

Oct. 2, 1928.  
F. H. LOFTUS  
1,686,386  
FURNACE ROOF CONSTRUCTION  
Filed April 5, 1927  3 Sheets-Sheet 1

INVENTOR  
Fred H. Loftus  
by William B. Wharton  
his attorney

Oct. 2, 1928.  
F. H. LOFTUS  
1,686,386  
FURNACE ROOF CONSTRUCTION  
Filed April 5, 1927     3 Sheets-Sheet 2
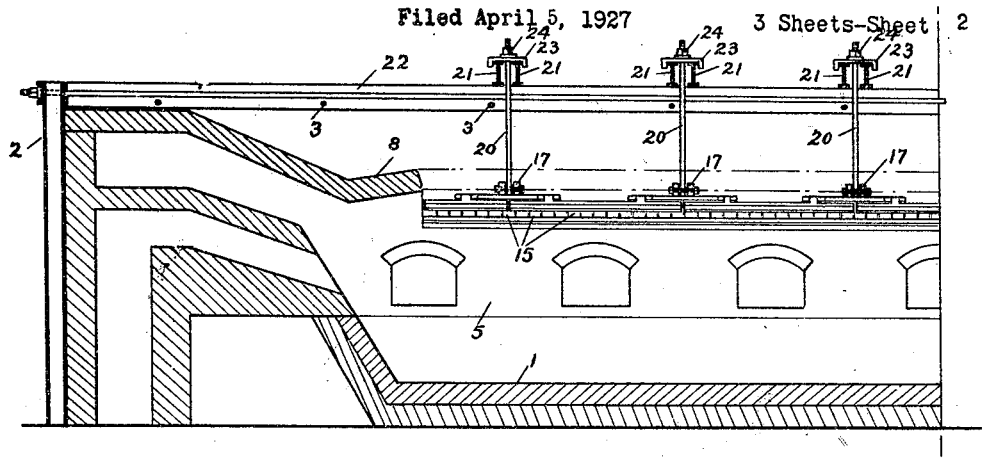
FIG. 2
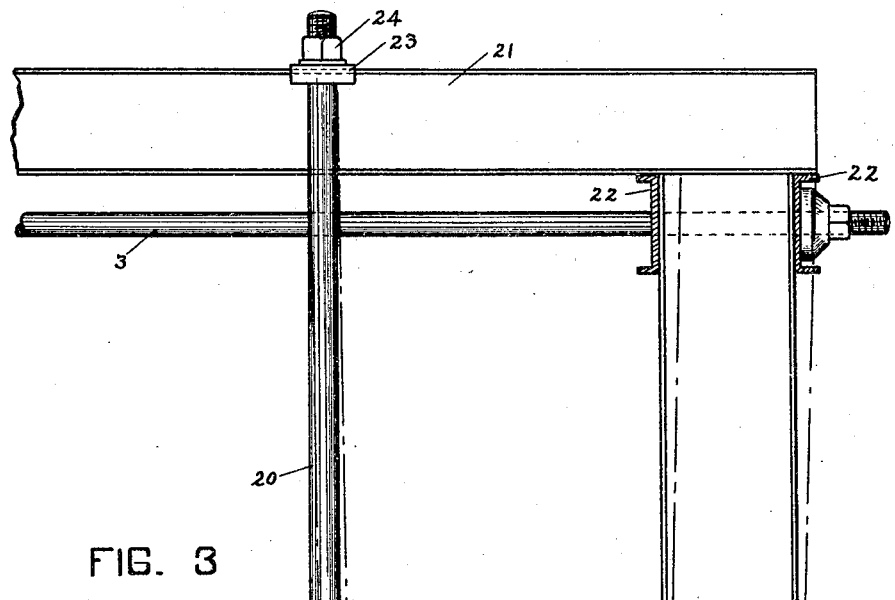
FIG. 3
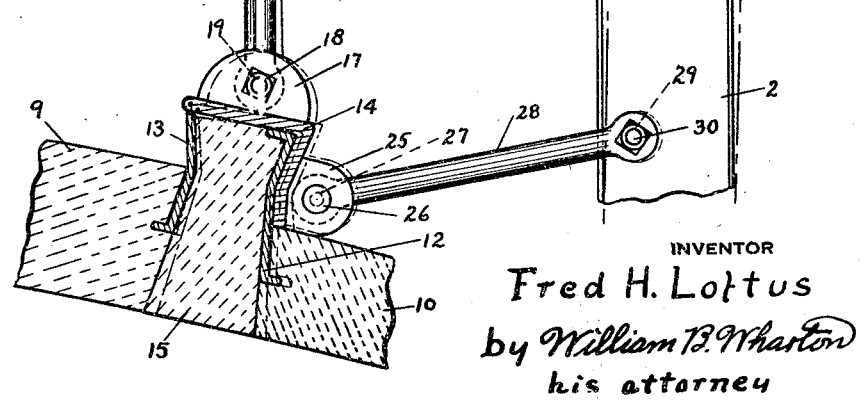
INVENTOR  
Fred H. Loftus  
by William B. Wharton  
his attorney Oct. 2, 1928.

F. H. LOFTUS 1,686,386

FURNACE ROOF CONSTRUCTION

Filed April 5, 1927   3 Sheets-Sheet 3

INVENTOR
Fred H. Loftus
by William B. Wharton
his attorney

Patented Oct. 2, 1928.

1,686,386

UNITED STATES PATENT OFFICE.

FRED H. LOFTUS, OF PITTSBURGH, PENNSYLVANIA.

FURNACE-ROOF CONSTRUCTION.

Application filed April 5, 1927. Serial No. 181,062.

This invention relates to furnace roof construction, and more especially to a roof construction for use in basic open hearth furnaces.

In prior open hearth furnace construction the roof and walls usually meet at a point of about 5 feet above the fore plate level. The roof has a uniform curvature, and usually rises about 2 feet for an 18 foot span. The roof is constructed entirely of silica brick and is supported on skew-backs, which are located immediately above the walls and rest on a channel construction supported by the binding members of the furnace known as buck-stays.

In this particular type of construction there is a segment of the roof, adjacent the skew-backs along the front and back walls and over the hearth of the furnace, which is subject to rapid destruction due to the operation of the furnace.

The destruction is caused by abrasion and chemical reaction. During the initial stage of the heat, when the furnace is charged with lime and scrap, the scrap fills the laboratory of the furnace almost to the roof, leaving a channel between the scrap and the back wall and also a channel between the scrap and the front wall. The scrap causes the flame to divide, so that a portion of it passes along the back wall and the remainder along the front wall. Due to the fact that the skew-backs are the lowest points on the roof, the flame comes in contact with the brick work thus causing a section of the roof about 2 feet in width to become highly heated. The gases, during this initial stage of the heat, abrade the brick work of the roof in these regions until the scrap charge becomes melted. After the iron has been charged, and the lime begins to rise, the gases become laden with basic oxides. During this operation, the furnace has been constantly gaining in temperature, and the segments along the skew-backs are much higher in temperature than the remaining portion of the roof. Due to the high temperature of the segments the basic oxides react with the acid material causing a sweating or fluxing action.

With the prior roof constructions it is very difficult to make repairs in the roof. When making repairs it is necessary to chill the furnace which has a deleterious effect on the brick work and shape of the roof. It is usually necessary to make initial repairs between 75 and 100 heats, and thereafter about every 50 to 75 heats. This is accomplished by replacing a small section of the roof at a time, and by suspending the centers with wire secured to the structural construction over the roof. After about three such repairs have been made, the furnaceman finds that the cooling and heating of the furnace, and uneven expansion of the old and new brick work, weakens the roof to such an extent that it is necessary to replace the entire roof, although the material remaining in the central portion of the roof may still be from seven to nine inches in thickness.

In prior roof construction no provision is made for variations in expansion between the interior and exterior surface of the roof. The present method is to increase the span of the roof, upon heating, by means of the tie rods, the thrust of the roof causing the binding members of the furnace to move outwardly. This increase in span will provide added space for the interior surface, but owing to the lesser expansion of the exterior surface of the roof, gaps will be formed in the brick work. Such a condition requires the interior surface, which is at the maximum temperature, to support the entire load of the roof. This effect is unsatisfactory due to the weakened condition of the material at such time. The condition results in spalling and cracking of the brick work, and, when the roof becomes thin, causes sagging due to the gaps between the bricks at their outer extremity.

With my invention I have provided a construction in which the main section of the roof outside the usual zone of destruction is supported independently of the segments which are rapidly destroyed. In place of silica I have substituted chrome material or other suitable non-reactive material in the zone of destruction, to counteract the chemical reaction which exists therein. I am able to substitute this material by carrying the load and thrust of the main roof on auxiliary members, so that the relatively short spans in the zones of destruction are relieved of the load and thrust of the roof as a whole. By actual test chrome composition material has proven to form a stable arch under high temperature. With such a construction I am able to extend the life of the roof to three times its present campaign, utilizing to the fullest extent the material in the center of the roof.

Figure 4:
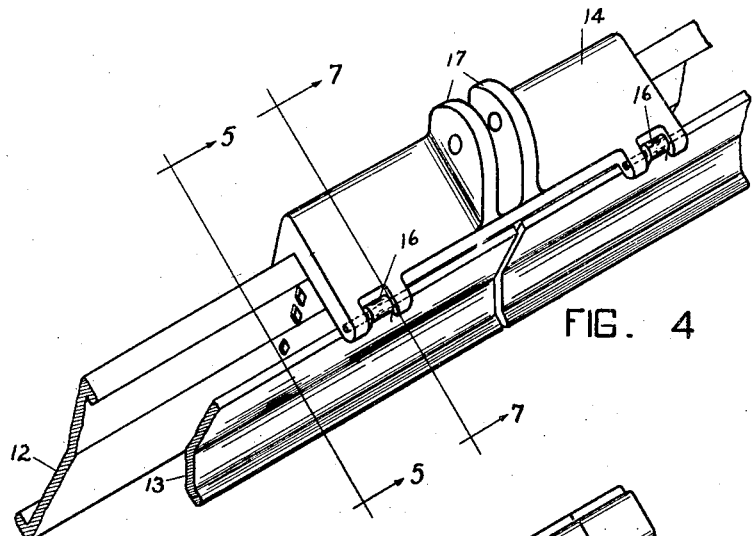
Figure 6:
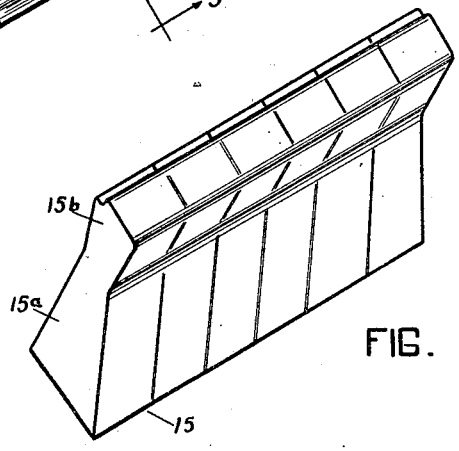
Figure 7:
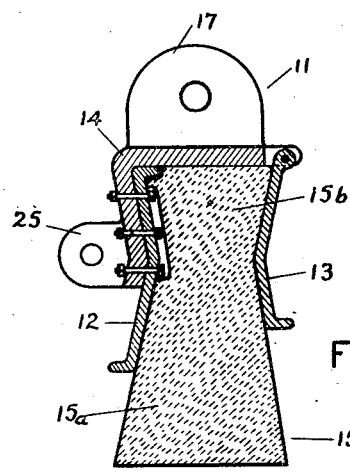
Figure 5:
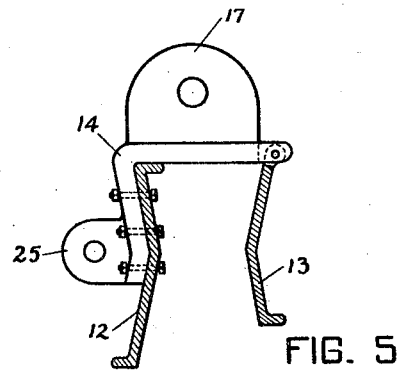

In the accompanying drawings Figure 1 is a vertical transverse section through an open hearth furnace embodying the improved roof construction of the present invention; Figure 2 is a fragmentary longitudinal sectional view of the furnace, on a smaller scale than Figure 1, taken along the line of the thrust members of the present construction; Figure 3 is an enlarged detail view, partly in elevation and partly in section, showing one of the thrust members of the roof and the elements immediately associated therewith; Figure 4 is an isometric view of the containing members of the thrust member assembly; Figure 5 is a cross sectional view on the line 5—5 of Figure 4; Figure 6 is an isometric view of a number of the refractory members to be inserted in the containing members to complete the assembly; and Figure 7 is a cross sectional view on the line 7—7 of Figure 4, but showing the refractory members in position.

In the drawings the reference numeral 1 designates the hearth of the furnace and the reference numeral 2 the buck-stays of the furnace frame. Opposite buck-stays are interconnected by tie rods 3. Extending vertically from the hearth 1 of the furnace are the back wall 4 and the front wall 5. On the walls 4 and 5 are skew-backs 6, which are in contact with the front and back edges of the roof and which are supported by channel members 7.

The roof, designated generally by the reference numeral 8, is formed on a continuous curve, and comprises a central portion 9 formed of silica brick. Adjacent the front and back walls of the furnace, and supported by the skew-backs 6 are roof segments or portions 10 of a material which is non-reactive to the basic oxides which impinge against these portions of the roof, in what has been herein called the zones of destruction. Such material is desirably chrome brick, but may be of magnesite brick or other suitable refractory material which is non-reactive under the conditions of operation in the furnace. Because of the inability of chrome or magnesite brick to withstand compressive stresses, and for the purpose of facilitating repairs in the furnace roof, means are provided for supporting the load and taking the thrust of the central portion 9 of the roof independently of these non-reactive portions 10.

Such means comprise thrust members, indicated generally by the reference numeral 11, which are interposed between the central roof portion 9 and the outer non-reactive roof portions 10. The thrust members 11 comprise metallic side members 12 and 13, which are interconnected by means of brackets 14. When assembled in a furnace roof, as shown in Figure 2, the bracket members 14 are desirably so positioned as to straddle and interconnect adjacent lengths of the side members 12 and 13.

Between side members 12 and 13 are interposed a succession of blocks 15, which may be of silica brick or other suitable refractory material. As shown in Figures 5 and 6, the blocks 15 are so formed as to have an outwardly inclined lower portion $15^a$ and an inwardly inclined upper portion $15^b$. This conformation of the blocks permits them to be securely held in position by the side members 12 and 13, which are angular in section, as shown. In order that the blocks 15 may be inserted between the side members, to be engaged thereby, the member 13 has a hinged connection 16 with the brackets 14 to which it is attached. This side member may, therefore, be raised to permit the insertion of the refractory blocks, and may be lowered to engage them after their insertion.

The bracket 14 of the assembly is provided with lugs 17 extending upwardly therefrom and having bolt holes for the reception of bolts 18 by which the bracket is connected with the eye 19 of a supporting rod 20. Each of the supporting rods 20 is connected with overhead beams 21 resting on cross beams 22 which are supported by the buck-stays 2. The supporting means for the rods 20, as shown in Figures 2 and 3, comprise plates 23 extending over two of the beams 21, and a nut 24 which rests on the plate 23 and engages a screw threaded portion on the upper end of the rod 20. On one side of the bracket 14 are spaced lugs 25 provided with bolt holes for receiving the bolt 26 passing through an eye 27 on a compression bar 28. At the other end of the compression bar is an eye 29 for receiving a bolt 30 to connect the bar to one of the buck-stays 2.

When in position in the furnace roof the thrust members 11 provide support for the roof as a whole, and, because of the thrust bar 28, serve to take the thrust of the central portion 9 of the roof. It should be noted that the flaring sides of the thrust members are in a plane perpendicular to the line of thrust of the roof, and it should also be noted that the metallic side member 12 is longer than the hinged side member 13. The additional support of the side members prevents shearing of the refractory blocks 15 under the thrust of the central roof portion 9 and the difference in length of these members is highly desirable. When the roof is new the longer member 12 reinforces the refracting material against the line of thrust of the roof. As the roof wears away the line of thrust of the roof moves upwardly, until it is along such line that the shorter member reinforces the refractory material against it. With this arrangement it is immaterial that the longer member is burned away gradually during the operation of the furnace, as at such time the shorter member reinforces against the thrust.

Because the thrust members 11 assume the load and thrust of the greater part of the roof, it is possible to construct the portions or segments 10 of the roof of the desired non-reactive material, even though this material is lacking in compressive strength. Also these portions may be replaced, when necessary without detriment to the central portion 9 of the roof.

The use of the thrust members also provides for the difference in expansion between the interior and exterior surface of the central portion of the roof. When the furnace is being brought up to temperature, the tie rods 3 may be loosened in the customary manner, and the thrust of the roof forces the buck-stays 2 outwardly. Due to the fact that the compression bars 28 are rotatably connected with the buck-stays and the thrust members, the thrust members are caused to rotate slightly into the position indicated in dotted lines in Figure 3 of the drawings. This permits a movement of expansion for a greater distance on the interior surface of the central portion of the roof than on its exterior surface. This effect is possible because the expansion of the chrome brick in the outer roof portions 10 is less than that of the silica brick in the central roof portion 9.

When chrome brick is used as the non-reactive material in the outer roof portions constituting the zones of destruction, it is possible to secure a much longer life on a 9 inch section of chrome in this region than would be possible with a 12 inch section of silica brick. It should be understood, however, that in any furnace roof constructed of a single material, in which the roof wears away more rapidly adjacent a wall or walls of the furnace, the use of the thrust members is of great advantage in facilitating repairs which consist in the replacement of an outer section or sections of the roof.

What I claim is:

1. In furnace roof construction a roof portion of chemically neutral material adjacent a wall of the furnace, and means interposed between said portion and the remainder of the roof arranged to assume the load and thrust of the remainder of the roof.

2. In furnace roof construction a roof portion of chrome brick adjacent a wall of the furnace, and means interposed between said portion and the remainder of the roof arranged to assume the load and thrust of the remainder of the roof.

3. In furnace roof construction roof portions of chemically neutral material adjacent two opposed walls of the furnace, an intervening portion of different material, and means interposed between each of the chemically neutral portions and the intervening roof portion arranged to take the load and thrust of the intervening portion.

4. In furnace roof construction roof portions of chrome brick adjacent two opposed walls of the furnace, an intervening portion of different material, and means interposed between each of the chrome brick portions and the intervening portion arranged to take the load and thrust of the intervening portion.

5. In furnace roof construction comprising a roof formed on a continuous curve, two parallel thrust members spaced on opposite sides of the apex of the roof, and means connected with said thrust members and with the frame work of the furnace for assuming the load and thrust of the portion of the roof between said thrust members.

6. In furnace roof construction comprising a roof formed on a continuous curve, two parallel thrust members spaced on opposite sides of the apex of the roof, supporting members connected with said thrust members and with the framework of the furnace, and compression members connected with said thrust members and with the framework of the furnace.

7. In furnace roof construction a roof portion of material which is non-reactive to basic laden fumes, and means interposed between said portion and the remainder of the roof arranged to assume the load and thrust of the remainder of the roof.

8. In furnace roof construction roof portions of a material which is non-reactive to basic laden fumes adjacent two opposed walls of the furnace, an intervening portion of different material, and means interposed between each of the non-reactive portions and the intervening portion to assume the load and thrust of the intervening portion.

9. In furnace roof construction the combination of a roof formed on a continuous curve, two parallel thrust members spaced on opposite sides of the apex of the roof, beam members above the roof, supporting members connected with said overhead beam members and with said thrust members, and compression members connected with said thrust members and with the framework of the furnace.

10. In furnace roof construction the combination of a roof formed on a continuous curve, two parallel thrust members spaced on opposite sides of the apex of the roof, beam members above the roof, supporting members connected with the beam members and rotatably connected with the thrust members, and compression members rotatably connected with the thrust members and with the framework of the furnace.

11. In furnace roof construction a member for interposition between adjacent roof portions comprising spaced metallic side members, a metallic connecting member to which said side members are attached, and a filling of refractory material engaged by said metallic side members.

12. In furnace roof construction a member for interposition between adjacent roof portions comprising spaced metallic side members of unequal length, a metallic connecting member to which said side members are attached, and a filling of refractory material engaged by said metallic side members.

13. In furnace roof construction a member for interposition between adjacent roof portions comprising spaced metallic side members, a metallic connecting member to which said side members are attached, one of said side members being pivotally attached to the connecting member, and a filling of refractory material engaged by said metallic side members.

14. In furnace roof construction a member for interposition between adjacent roof portions comprising spaced metallic side members of unequal length, a connecting member to which said side members are attached, one of said side members being pivotally attached to the connecting member, and a filling of refractory material engaged by said side members.

15. In furnace roof construction a roof formed on a continuous curve comprising roof portions adjacent two opposed walls of the furnace, and intervening roof-portion, and means interposed between each of the portions adjacent the furnace wall and the intervening portion to assume the load and thrust of the intervening portion.

16. In furnace roof construction a roof formed on a continuous curve comprising a roof portion adjacent one wall of the furnace, and means interposed between the portion adjacent the furnace wall and the remainder of the roof to relieve such portion of the load and thrust of any remaining portion of the furnace roof.

In witness whereof, I hereunto set my hand.

FRED H. LOFTUS.